INVENTOR.
ALFRED W. GUNNING

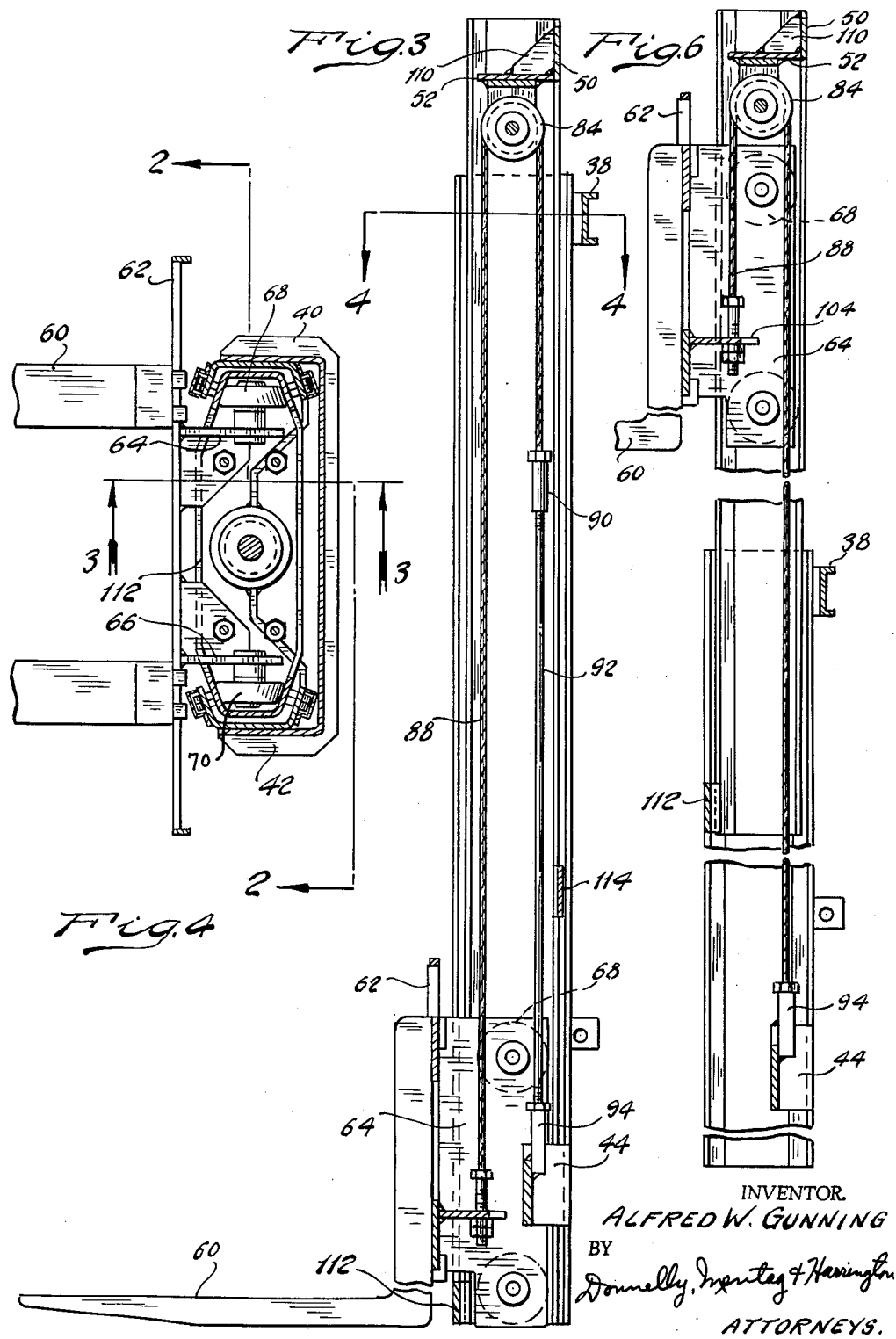

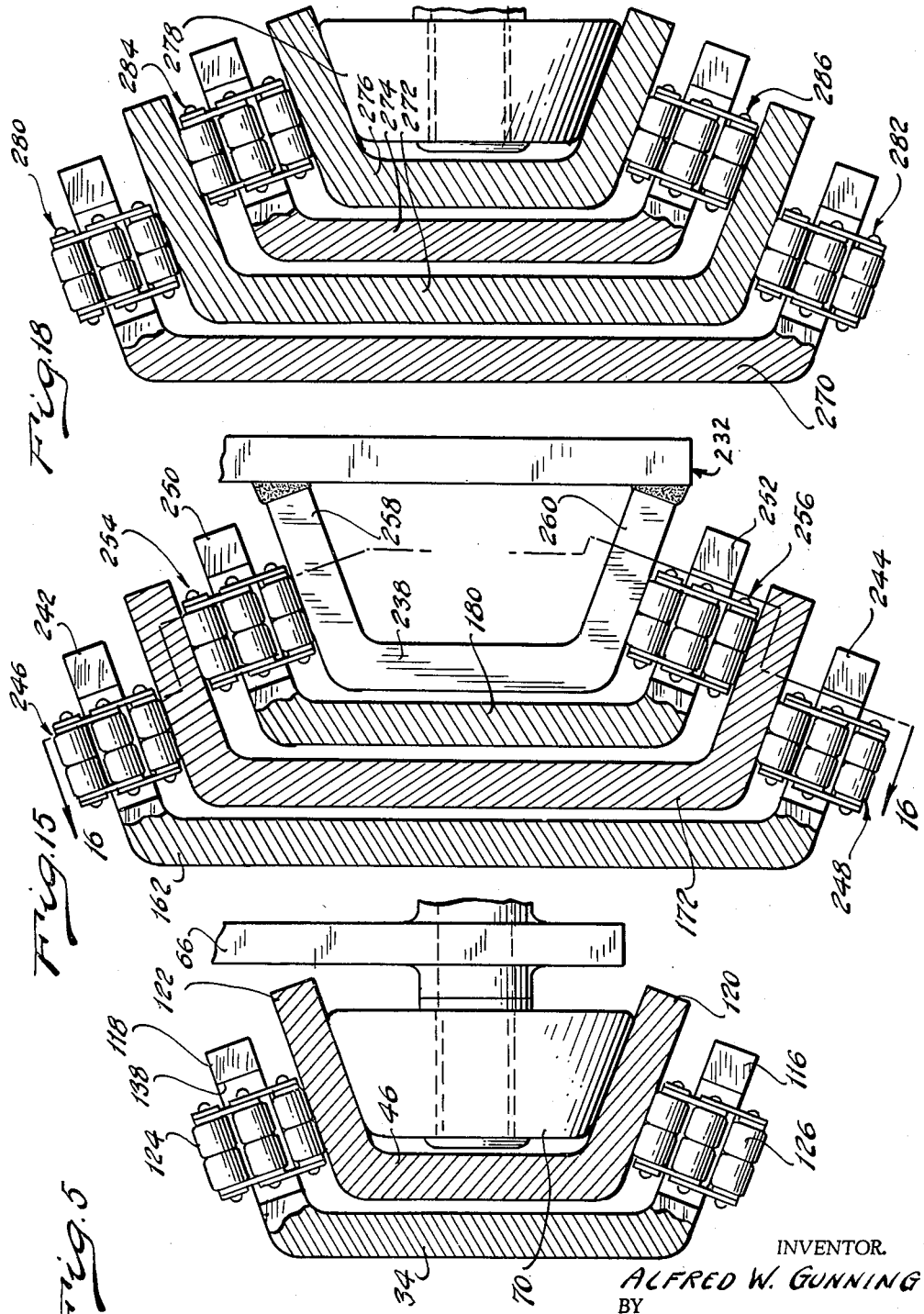

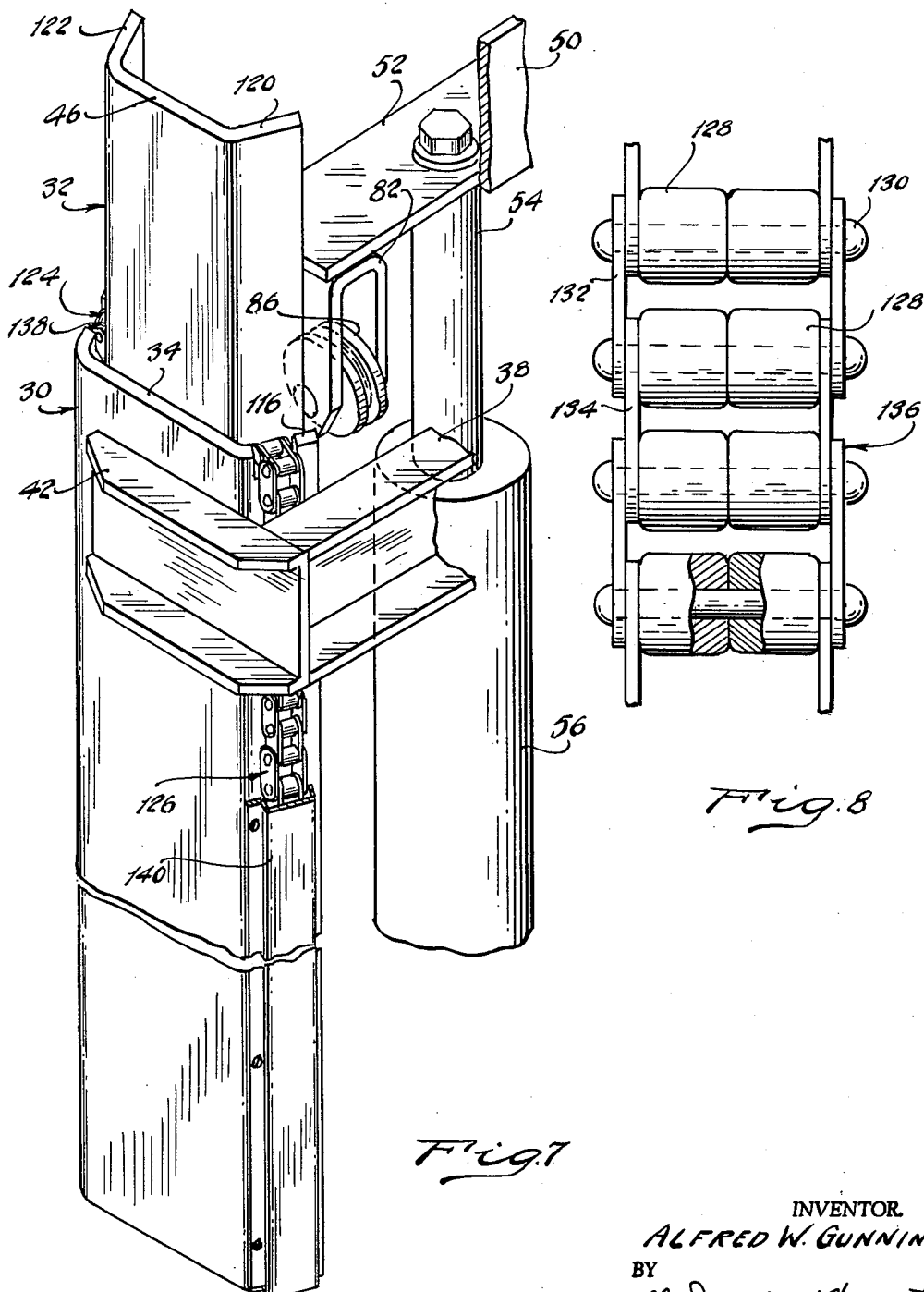

INVENTOR.
ALFRED W. GUNNING

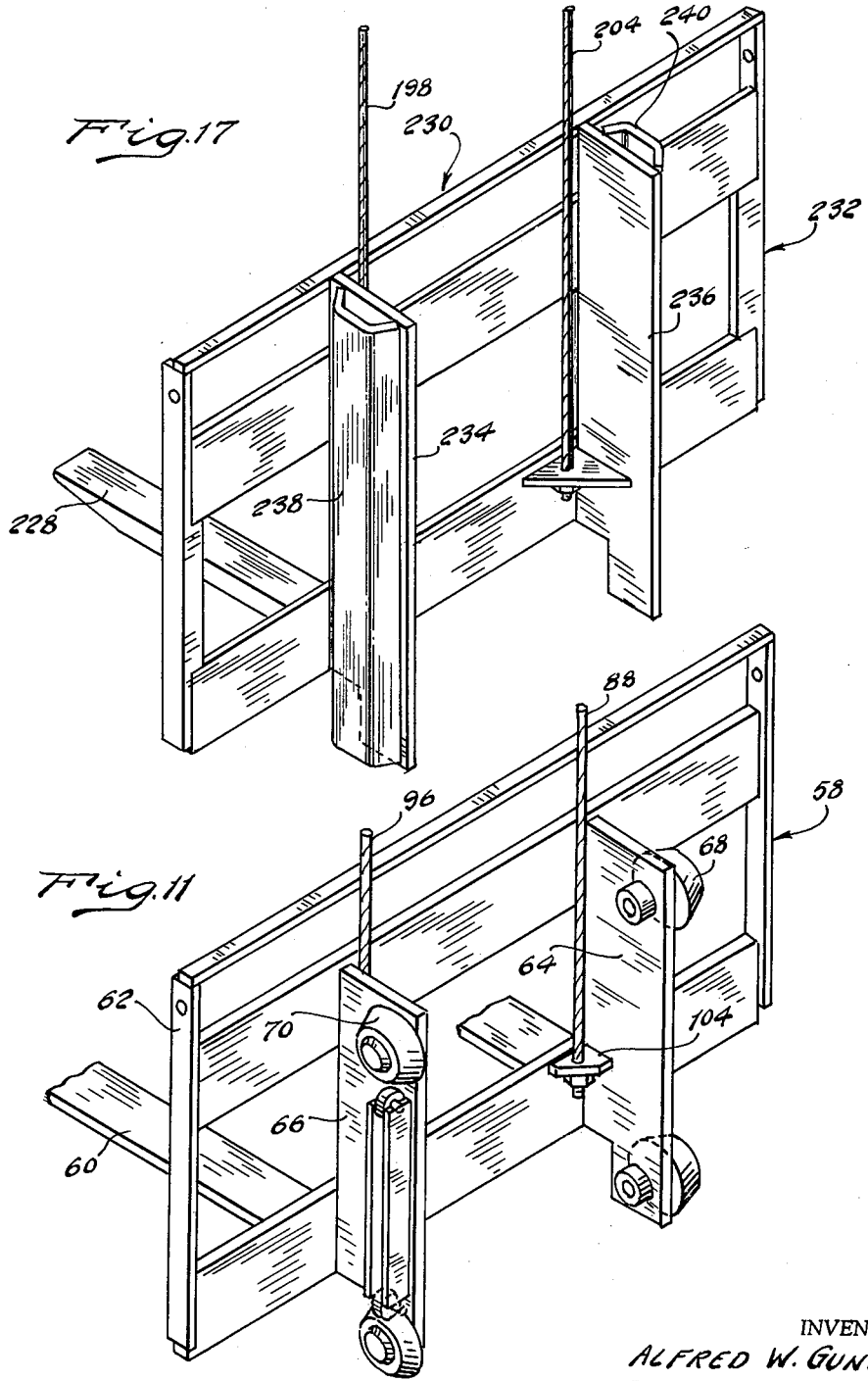

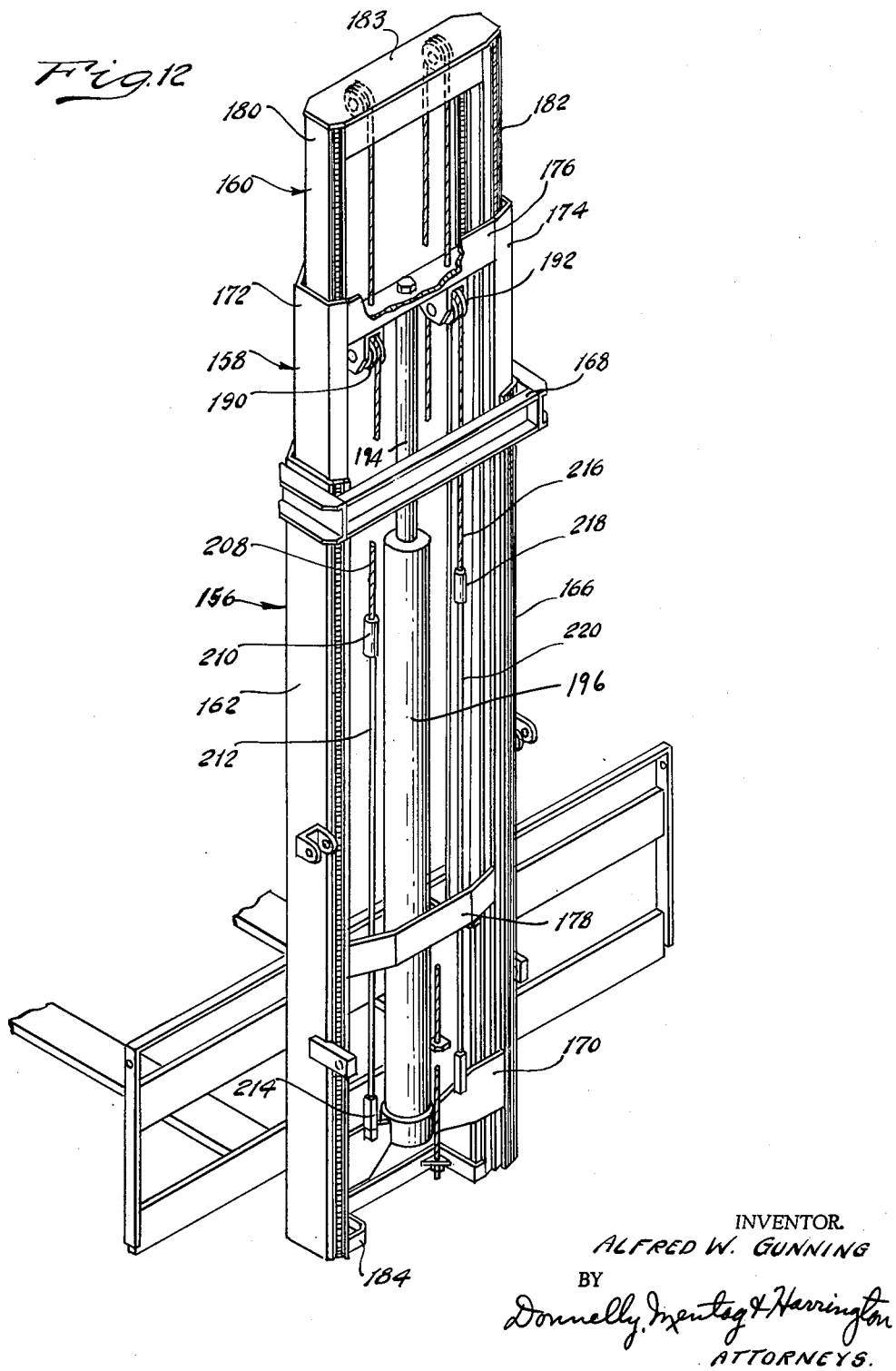

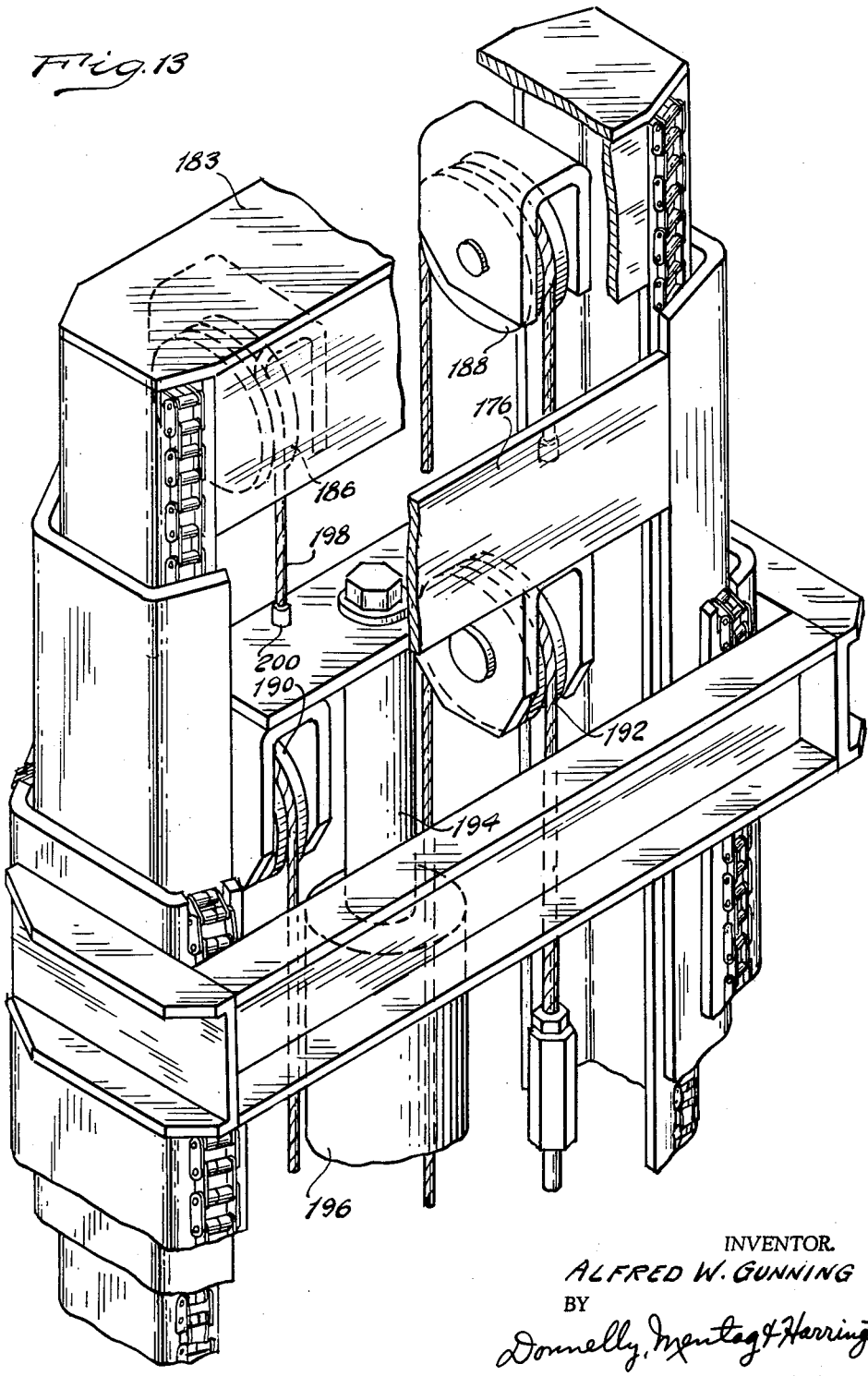

Oct. 30, 1962 A. W. GUNNING 3,061,047
MULTIPLE SECTION MATERIALS HANDLING STRUCTURE
WITH ANTI-FRICTION BEARINGS
Filed Oct. 16, 1961 13 Sheets-Sheet 10

INVENTOR.
ALFRED W. GUNNING
BY
Donnelly, Mentag & Harrington
ATTORNEYS.

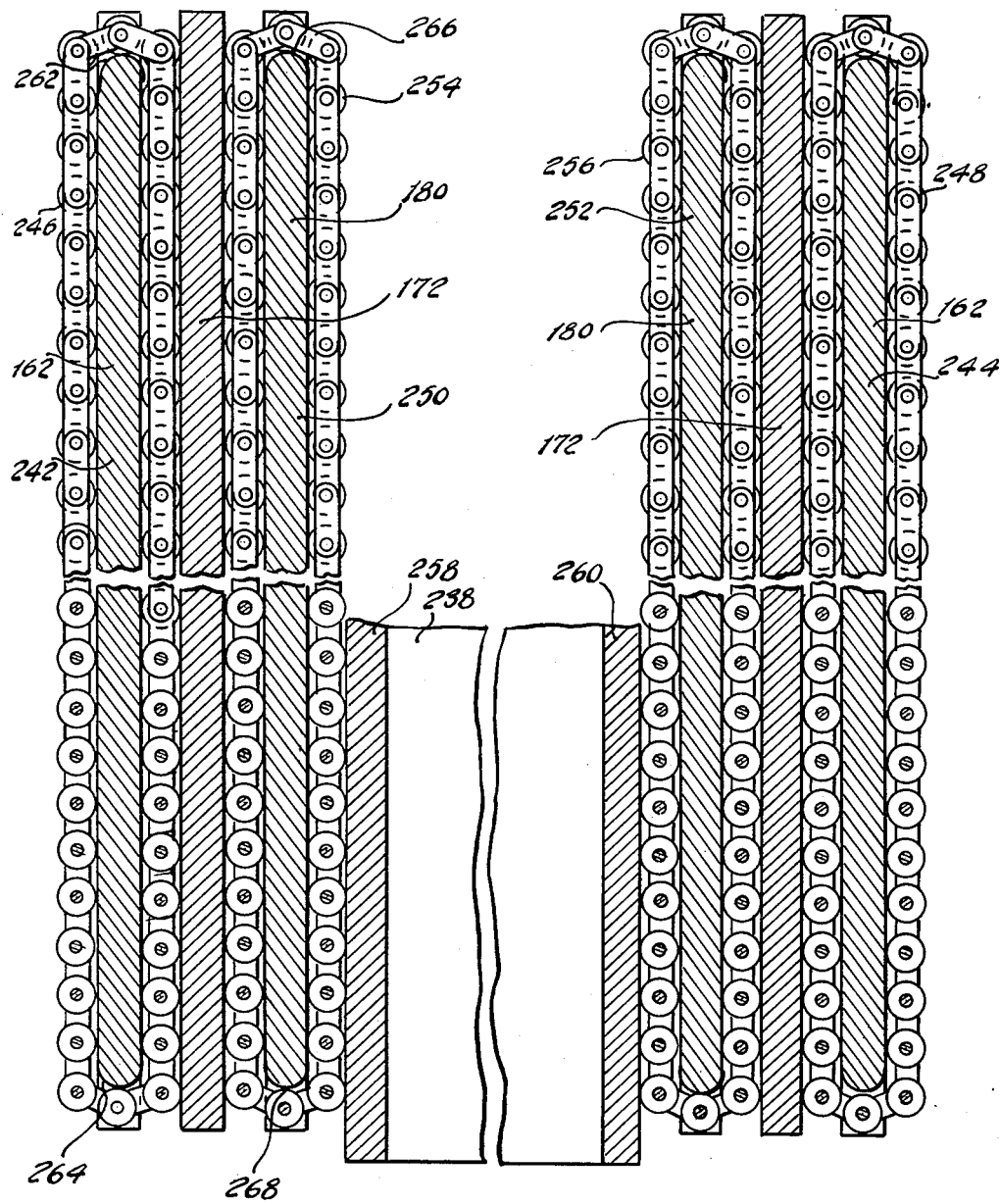

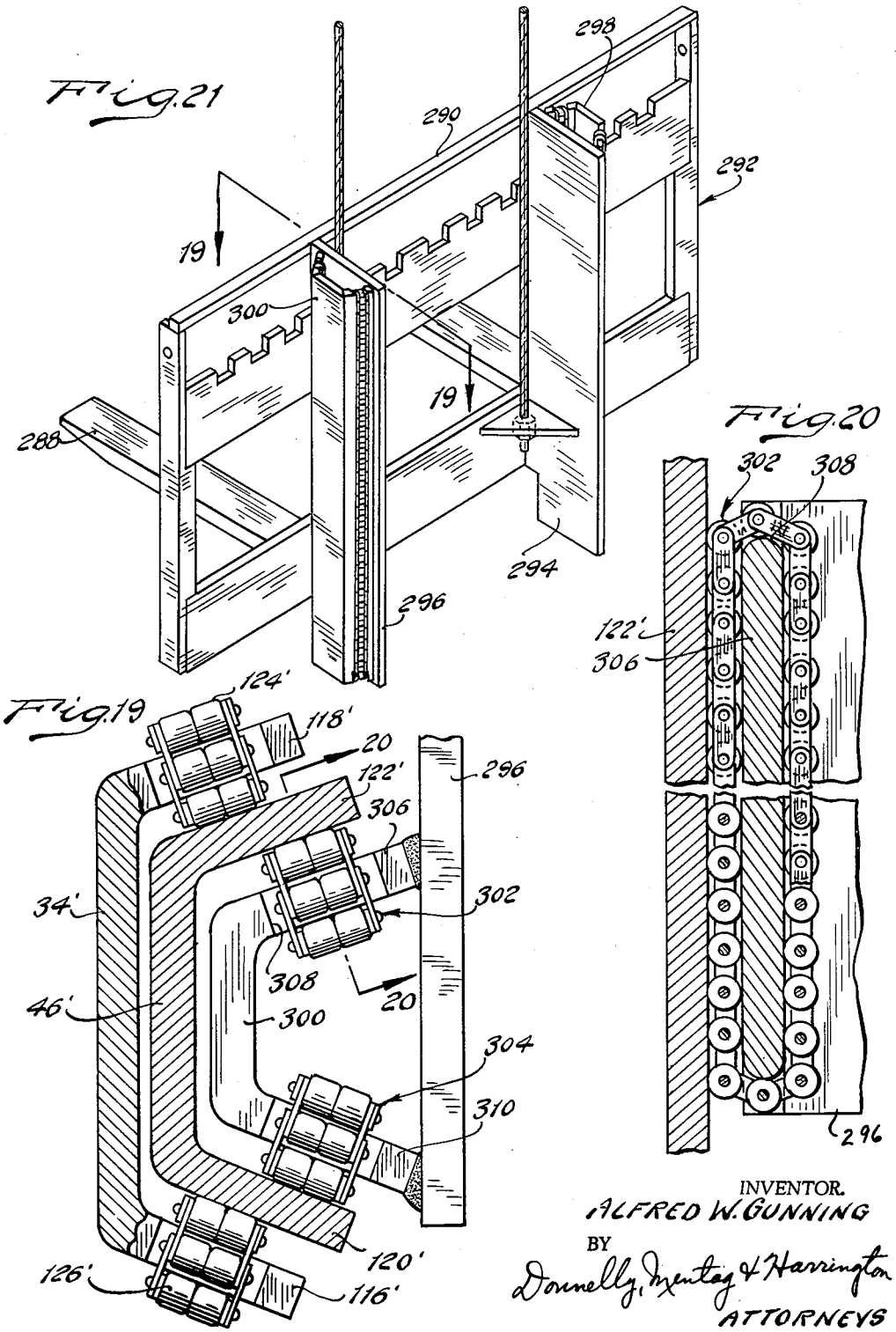

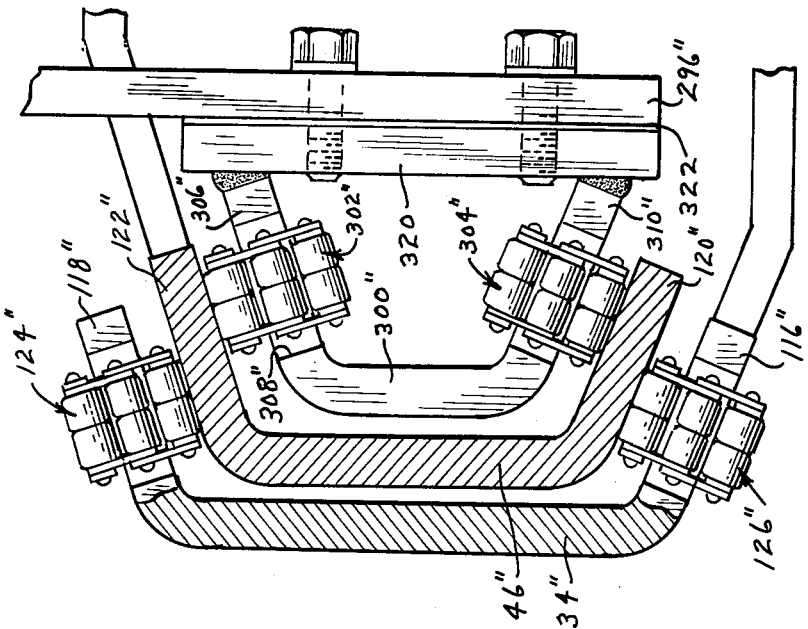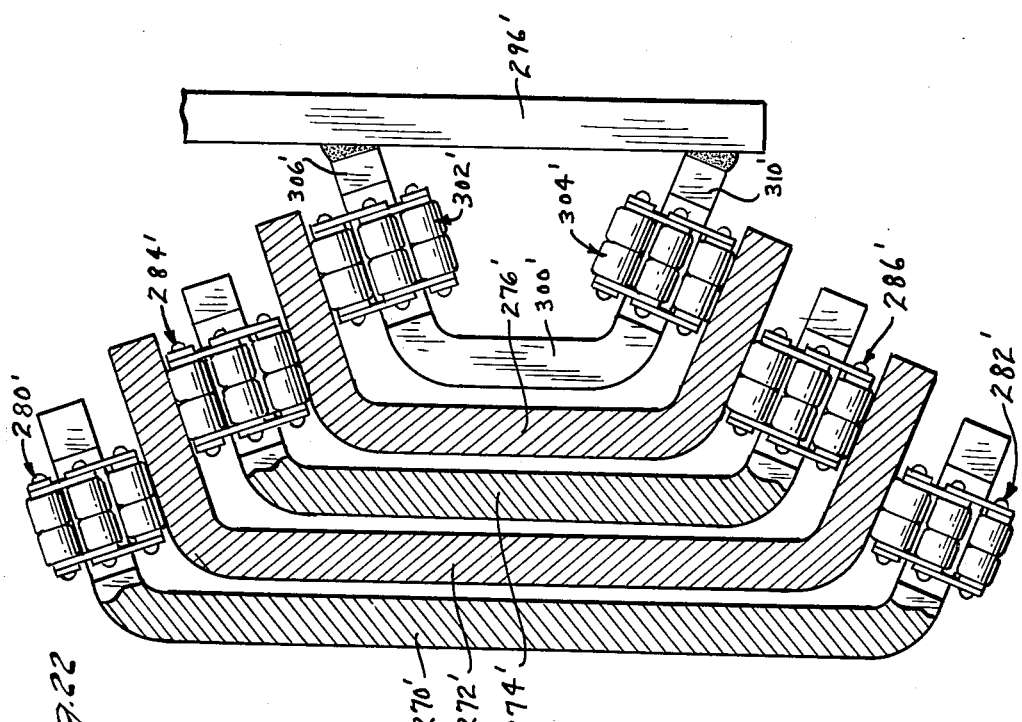

United States Patent Office 3,061,047
Patented Oct. 30, 1962

3,061,047
MULTIPLE SECTION MATERIALS HANDLING STRUCTURE WITH ANTI-FRICTION BEARINGS
Alfred W. Gunning, Richland, Mich., assignor to Multi-Lift Co., Detroit, Mich., a corporation of Michigan
Filed Oct. 16, 1961, Ser. No. 145,113
15 Claims. (Cl. 187—95)

My invention relates generally to improvements in materials handling equipment, and more particularly to a load hoisting mast capable of being mounted upon either a stationary base or a wheeled chassis.

The improvement of my invention can be applied readily to mast constructions that are adapted primarily for use with lift trucks for warehouses and industrial plants as well as with outdoor lift trucks of the type employed in the building and construction industry.

This disclosure is a continuation-in-part of my co-pending applications Serial Nos. 70,459 and 127,240, filed November 21, 1960 and July 27, 1961, respectively. These applications are assigned to the assignee of my instant invention.

In my co-pending applications I have disclosed load hoisting masts having multiple stages or sections, each section having spaced, parallel side rails. The corresponding rails of each mast section are related telescopically and the carriage is supported by the mast and adapted for movement relative to the mast sections at a predetermined speed ratio when the mast sections are moved relative to each other. Continuous recirculating anti-friction elements are situated between cooperating sides of the rails for each mast section. The anti-friction elements encircle the mast sections and are arranged parallel to the geometric axes thereof so that when one rail is moved relative to the other, the anti-friction chain will recirculate in the direction of relative motion of the rails.

In the embodiments shown in the co-pending applications, recirculating bearing elements in the form of roller chains are mounted about the rails for the first relative movable mast section. Thus, if the mast section has two sections, one section being stationary and the other being movable, the chains would be mounted for circulation about the movable section to provide a bearing action between the side rails of the movable section and the corresponding side rails of the stationary section. It would provide also a relatively friction-free bearing for the carriage that is mounted in telescopic relationship with respect to the side rails of the movable section.

In the three stage mast disclosed in the earlier applications the recirculating anti-friction elements are mounted about the rails for the first movable mast section to provide a friction-free bearing action between these rails and the corresponding rails of the stationary mast section. It provides also a bearing action between these side rails and the corresponding side rails of the innermost or third mast section. In the three stage mast construction disclosed earlier, the carriage is mounted within the innermost mast section and is supported therein by means of spaced rollers.

In the four stage mast construction disclosed earlier, the recirculating bearing elements are arranged about the side rails of the first movable mast section and the third movable mast section. Each of the bearing elements provides friction-free relative motion of the various movable side rails. It provides also friction-free movement of the carriage relative to the innermost side rails. The carriage in such a four rail mast construction as well as the two rail mast construction comprises guides that are similar in cross sectional shape to the rails of the innermost mast section.

It will be assumed for purposes of discussion that the rails of the stationary or outermost mast section are the first side rails. The side rails of the next adjacent mast section then will be referred to as the second mast section. The rails of the next adjacent mast section will be referred to as the third mast section and the next adjacent rails will be referred to as the fourth mast section. It is apparent therefore that in the constructions disclosed earlier the bearing elements are arranged for circulation about the rails of the even numbered mast sections. Those mast constructions that employ an odd number of sections, such as the previously disclosed three stage mast construction, employ a carriage having guide rollers disposed within the innermost mast section. On the other hand, the mast constructions previously disclosed that have an even number of sections utilize a carriage with longitudinal guide channels or members that engage the recirculating bearing elements for the innermost mast section.

In contrast to the constructions disclosed earlier, the improved mast constructions of my instant invention employ a recirculating bearing that is mounted about the side rails for the odd numbered mast sections. Thus, in a two stage mast construction, the bearing would be mounted for circulation about the side rails of the stationary or first mast section, and the side rails for the movable mast section would be guided by this bearing means. In a three stage mast construction a bearing would be mounted for circulation about the side rails of the innermost mast section as well as the first or stationary mast section. The side rails for the intermediate or second mast section then would act against the bearing for the corresponding rails of both the stationary and innermost mast sections. The carriage for such a three stage mast construction may employ guide channels or bars that conform in shape to the shape of the side rails for the innermost mast section, the sides of the guides acting upon the bearing for the side rails of the innermost mast section. In a four stage mast construction in which the bearing structure is mounted upon the odd numbered side rails, the rails of the innermost mast section would be guided by the bearing structure for the third mast section. The rails for the second section would act upon each of the bearing structures for the first and third mast sections.

In the two section mast construction and the four section mast constructed in the manner described, I employ a carriage having guide rollers that act upon the side rails of the innermost mast section.

In an alternate form of my invention, an even number of mast sections is provided and the carriage employs a guide bar or channel that is adapted to be guided within the rails of the innermost section. Recirculating guide bearing structure can be mounted about the sides of the channels or guide bars for the carriage in a fashion similar to the corresponding bearings for the side rails themselves. A carriage employing such guide rails or bars can be used with a mast having an even number of sections and it would not be necessary therefore to employ a carriage having guide rollers. Thus it is possible to construct a load hoisting mast having an even number of side rails and which is fully friction-free in every respect.

To improve the side loading capacity of my improved mast constructions, I have formed the sides of each section with diverging sides so that transverse force couples as well as fore and aft force couples can be accommodated. The ability of the carriage to carry eccentric loads also is improved in this fashion.

The provision of improved mast constructions of the type discussed in the foregoing paragraphs being a principal object of my invention, it is another object of my invention to provide a mast construction having relatively movable structural members wherein rolling contact is provided between each of the relatively movable components.

It is a further object of my invention to provide a mast construction that employs a load hoisting carriage having guide bars or channels extending in the direction of relative motion and wherein a recirculating bearing element is mounted about the sides of the guide bars or channels thereby providing friction-free motion of the carriage as it is guided during operation within the side rails of an adjacent mast section.

It is a further object of my invention to provide mast constructions of the type generally described in the foregoing paragraphs wherein a plurality of relatively movable mast sections are employed and wherein a recirculating bearing means is mounted upon side rails for each odd numbered mast section, the stationary mast section being the first mast section and the uppermost mast section being the last of the series.

It is a further object of my invention to provide a mast construction having relatively movable mast sections wherein each section is comprised of spaced parallel side rails having diverging sides, and wherein a recirculating bearing means is mounted about the sides of the rails for the first or stationary mast section.

It is a further object of my invention to provide a mast construction having multiple stages and which is characterized by its ability to accommodate eccentric loading.

It is a further object of my invention to provide a mast construction having multiple telescopically related mast sections and which is characterized by increased load lifting capacity for any given size.

It is a further object of my invention to provide a mast construction having multiple telescopically related mast sections wherein an improved bearing means is provided for guiding the various mast sections during operation and for guiding the load hoisting carriage that is mounted for movement along the mast.

Further objects and advantages of my invention will become apparent from the following description and from the accompanying drawings wherein:

FIG. 3 is a cross sectional view of the structure of FIGS. 1 and 2 as viewed along section line 3—3 of FIG. 2;

FIG. 4 is a transverse sectional view taken along section line 4—4 of FIG. 3;

FIG. 5 is a partial cross sectional view taken along section line 5—5 of FIG. 2;

FIG. 6 is a longitudinal cross sectional view that is similar to the view of FIG. 3 except that the carriage is shown in an elevated position whereas the carriage is shown in a lowered position in FIG. 3;

FIG. 7 is an enlarged view of an upper portion of the structure of FIG. 1;

FIG. 8 is a detailed assembly view of a roller chain bearing means that can be employed in the mast constructions of my invention for guiding the side rails of the mast section and the carriage;

FIG. 11 is an isometric view of the carriage that can be used in the embodiment of FIGS. 1 through 8;

FIG. 12 is an isometric view of a three stage mast employing the features of my invention;

FIG. 13 is an enlarged view of an upper portion of the structure of FIG. 12;

FIG. 15 is a partial cross sectional view taken along line 15—15 of FIG. 12;

FIG. 16 is a partial longitudinal cross sectional view taken along section line 16—16 of FIG. 15.

FIG. 17 is an isometric view of a carriage that is shown in part in FIG. 15;

FIG. 18 is a cross sectional view corresponding to the views of FIGS. 5 and 15 and showing a four stage mast construction employing the principles of my invention;

FIG. 19 is a view corresponding to FIGS. 5, 15 and 18 showing a two stage mast construction that employs an improved carriage guide structure. It is taken along section line 19—19 of FIG. 21.

FIG. 20 is a partial cross sectional view taken along section line 20—20 of FIG. 19;

FIG. 21 shows in isometric form the improved carriage shown in part in FIG. 19.

FIG. 22 is a modification of the structure shown in the preceding views. It shows in part a four section mast with an improved carriage;

FIG. 23 is a further modification of the carriage structure changing means for adjusting the carriage to obtain the desired spacing of the guides;

Figure 1:
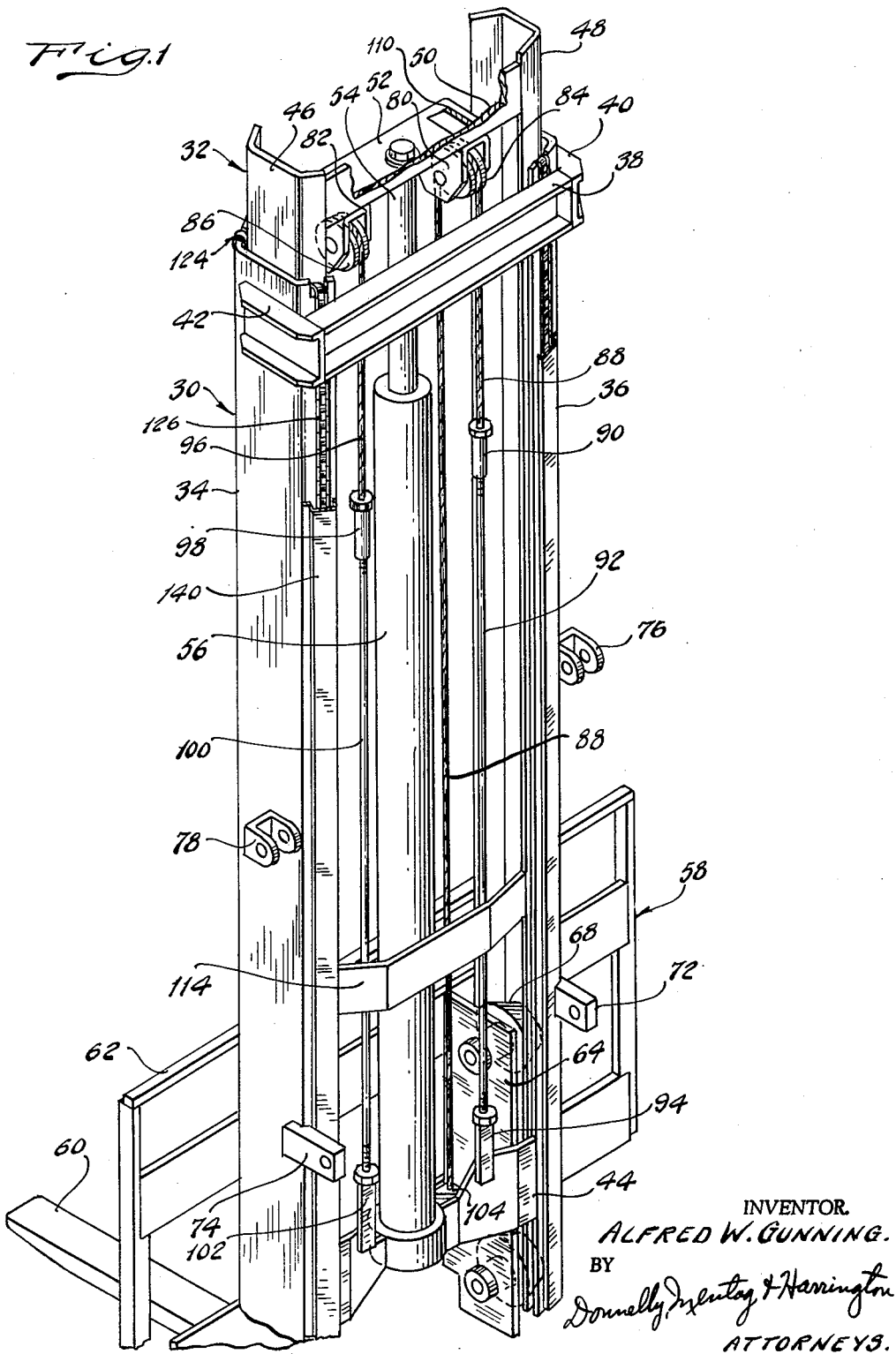
FIG. 1 is an isometric view of a two stage mast construction employing features of my invention.

The two section mast construction of FIGS. 1 through 7 will be described initially. Referring first to FIG. 1, numeral 30 designates generally a stationary mast section and numeral 32 designates generally a relatively movable mast section. Mast section 30 is comprised of a pair of spaced parallel side members in the form of channel rails. These side members or rails are identified by reference characters 34 and 36. The uppermost portions of the rails 34 and 36 are held together by a cross bracket 38 that in turn is connected to side brackets 40 and 42 secured to the rails 36 and 34, respectively. The lowermost portions of the rails 34 and 36 are held together by a bracket 44.

The mast section 32 comprises spaced parallel side rails 46 and 48 that are received, respectively, within the side rails 34 and 36 of the mast section 30. The cross sectional shapes of the side rails 46 and 48 are similar to corresponding shapes of the rails of the mast section 30 and are adapted to be disposed telescopically with respect to them. The upper ends of the rails 46 and 48 are secured together by a cross bracket 50, preferably in the form of an L-shaped channel. One leg 52 of the bracket 50 has secured thereto a ram 54 received within a hydraulic cylinder 56. The base of the cylinder 56 can be supported by the central portion of the bracket 44, the latter being recessed at its center toward the interior of the mast construction.

A carriage generally indicated at 58 includes forks 60 carried by a vertical face plate structure 62. Brackets 64 and 66 are welded or otherwise secured to the face plate structure 62 and they rotatably support rollers 68 and 70, respectively. There are two rollers 70 and two rollers 68 situated in longitudinally spaced relationship. Reference may be made to FIG. 11 for a clearer illustration of the construction of the carriage.

The rollers 68 are adapted to be received within the rail 48 and the rollers 70 are adapted to be received within the rail 46. The carriage 58 can be guided in this fashion when it is moved longitudinally in the direction of the axis of the mast construction.

Pivot brackets 72 and 74 are secured to side rails 36 and 34, respectively, to facilitate a pivotal connection with the relatively stationary chassis frame of a wheeled vehicle. Tilt cylinders and pistons anchored to the vehicle can be connected to brackets 76 and 78 secured to the side rails 36 and 34, respectively, at a location that is longitudinally spaced with respect to brackets 72 and 74. The mast construction then can be pivoted about the pivotal axis formed by the brackets 72 and 74. For purposes of the present description, it will be assumed that the forks 60 extend in a forward direction and that the brackets 72 and 74 are located at the rearward side of the mast construction.

The bracket 50 has secured thereto a pair of pulley supports shown at 80 and 82. A pulley 84 is journalled by the support 80 and a corresponding pulley 86 is journalled by the support 82. A flexible force transmitting member such as a cable or chain can be trained over the pulleys 84 and 86. In the embodiment shown, a cable 88 is trained over pulley 84 and one end thereof is anchored as shown at 90 to an anchor rod 92, the lower end of the rod 92 being secured at 94 to the aforementioned bracket 44. In a similar fashion a cable 96 is trained over pulley 86 and one end thereof is anchored at 98 to an anchor rod 100, the lower end of the rod 100 being secured at 102 to the bracket 44.

The other ends of the cables 88 and 90 are connected to a carriage 58. This can best be seen by referring again to FIG. 11. The cable 88 as shown in FIG. 11 is connected to a corner bracket 104 connected to a bracket 64 and the base plate structure 62 as indicated. The cable 96 similarly can be connected to the carriage 58.

The leg portion 52 of the upper bracket 50 is foreshortened in a transverse direction to provide clearance between each end thereof and the adjacent rails 48 and 46. This will permit the support brackets 64 and 66 and the associated upper rollers 68 and 70 to move beyond the leg portion 52 in a vertical direction thereby making possible an increased lifting height for the forks 60.

Figure 2:
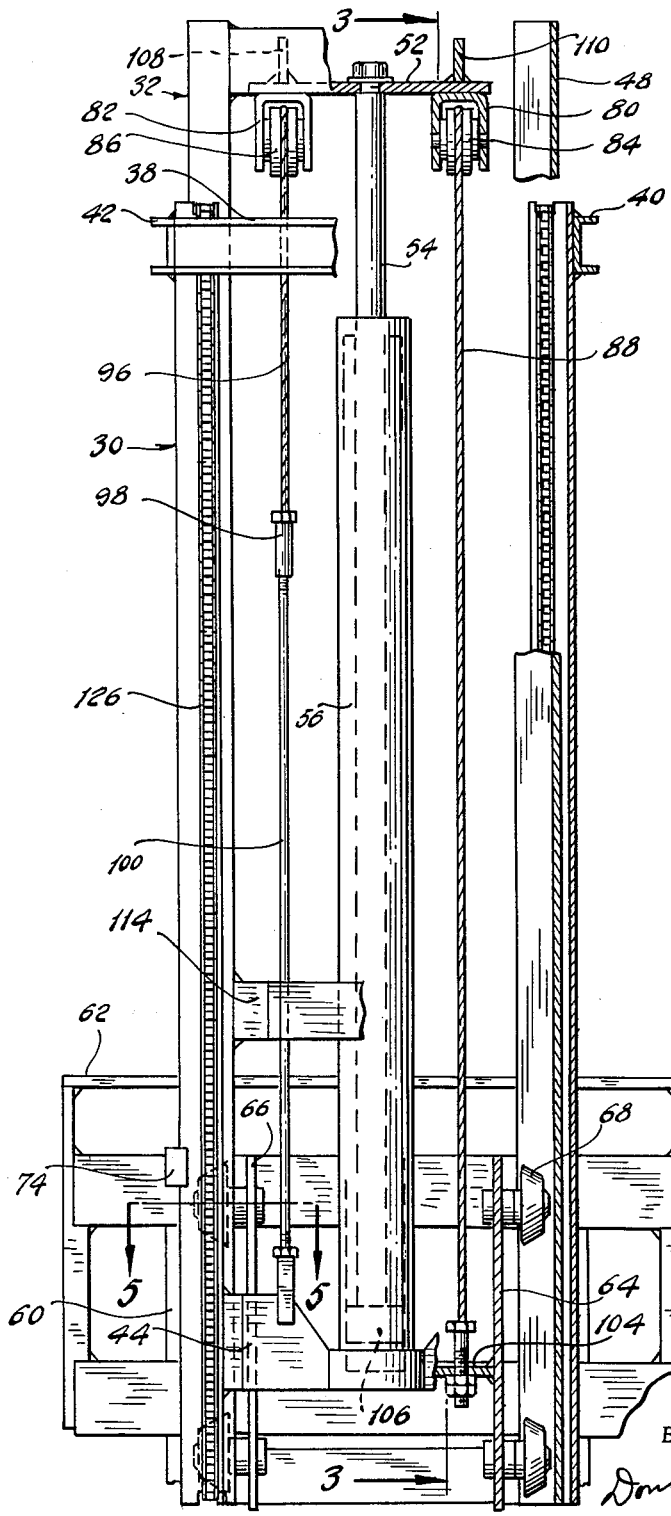
FIG. 2 is a rear elevation view of the mast construction of FIG. 1. It shows in partial section portions of the structure of FIG. 1, the plane of the section being along section line 2—2 of FIG. 4.

As best seen in FIG. 2, piston rod 54 is connected to a piston 106 that cooperates with a surrounding cylinder wall to define a pressure chamber. When fluid pressure is admitted to this pressure chamber, piston rod 54 is moved vertically upward as viewed in the drawings. This causes the mast section 32 to move relative to the stationary mast section 30. Of course the pulleys 84 and 86 will move with the mast section 32 and the carriage 58 thus will be moved vertically upward at a speed ratio of two to one relative to the speed of movement of piston 106. The supplemental brackets 108 and 110 can be used to increase the rigidity of the bracket 50 and the leg portion 52.

In FIG. 5 it will be observed that the rails 34 and 36 are in the form of channels each having a base and two sides. The angles formed by the sides of one channel with respect to its base being equal to the angles formed by the sides of the adjacent channel with respect to its base. The sides for the rail 34 are identified by reference characters 116 and 118 and the corresponding sides for the rail 46 are shown at 120 and 122. A bearing element in the form of a continuous roller chain is trained over the sides 118 and 116, the chain for side 118 being identified by reference character 124 and the corresponding chain for the side 116 being shown at 126. The construction of this chain is best illustrated at FIG. 8 and includes rollers 128 situated in tandem upon pins 130. These pins are connected together by links 132 and 134 to form a continuous chain. The rollers 128 are free to rotate on their respective pins. As best observed in FIGS. 1, 2 and 7, the roller chain, which hereafter will be generally identified by reference character 124, extends longitudinally throughout the entire length of the side 118. The upper end of the side 118 is recessed as shown at 138 to permit the chain to circulate thereover. The bottom or lower end of the side 118 similarly can be recessed. The base of the recess 138 can be rounded with a curvature that will permit the rollers 124 to negotiate the turn from one side of the rail 34 to the other.

The chain 126 is similarly arranged with respect to the side 116.

It will be apparent that the sides 120 and 122 will be guided by the roller chains 126 and 124, respectively. During relative motion of the rails 36 and 34, the chains 124 and 126 will circulate about the rail 34 and the speed of the circulation will be one-half the speed of the rail 46, by reason of the rolling action of the chain rollers.

Rollers 70 and 68 will provide proper guidance for the carriage. The rolling surfaces of the rollers 70 and 68 are tapered at angles that are substantially equal to the angle of divergence of the sides of the cooperating rails 46 and 48, respectively. A slight clearance will be provided between the rollers and the cooperating rail sides to permit rotation of the rollers to take place.

As seen in FIGS. 1, 2, 4 and 7 a chain cover 140 can be secured to the outer sides of the channels 34 and 36. These covers can be formed with a flange to accommodate bolts and they can extend throughout the entire longitudinal extent of the stationary mast section. One cover can be provided for each of the exposed portions of the roller chains. This will reduce the possibility of fouling of the chain and will prevent the possibility of personnel working in the vicinity contacting the chain.

An additional cross bracket 112 can be provided at the base of the said rails 46 and 48 for the movable mast section 32. When the carriage 58 is in the lowered position, the base plate structure 62 is disposed about the bracket 112 so that interference is avoided.

Another bracket 114 is situated between the rails 46 and 48 at the rearmost portion thereof. The carriage 58 will be moved to the position shown in FIG. 3 to an extreme upper position so that the overall height of the carriage is substantially greater than the stacked height of the mast. The motion of the mast is continuous during the actuation of the ram.

As best seen in FIG. 4, each of the side rails for the mast sections is formed with diverging sides, the roller chain being disposed between the sides. This is illustrated also in FIG. 5.

Figure 9:
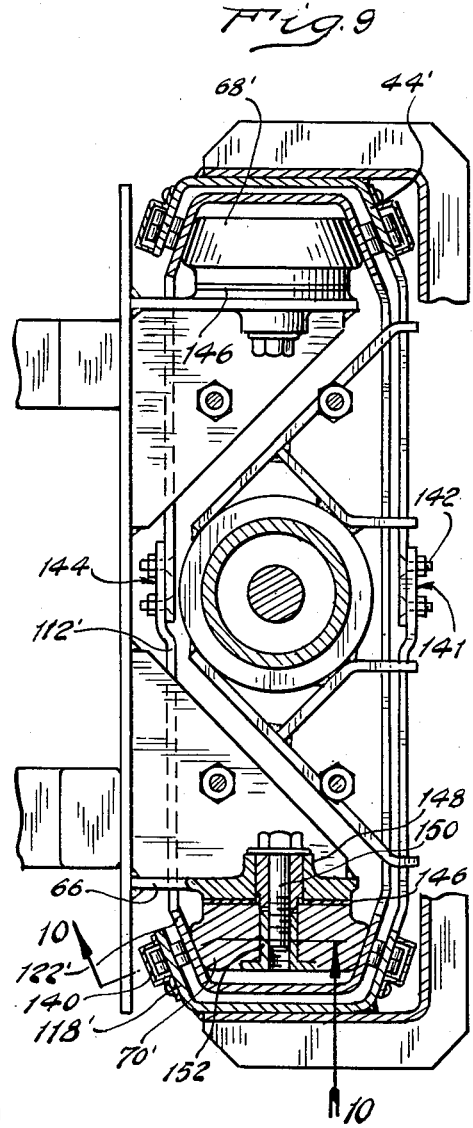
FIG. 9 is a transverse cross sectional view of an alternate form of a two stage mast construction embodying the principles of my invention.

In FIG. 9 I have illustrated an alternate mast construction. It includes many components that are common to the embodiment of FIGS. 1 through 7 and these components have been designated by similar reference characters although primed notations have been applied to the reference characters used in FIG. 9.

The embodiment of FIG. 9 includes means for adjusting the spacing between the rails of the mast section 32 and the rails of the mast section 30. The view of FIG. 9 is taken along a transverse cross sectional view and is similar in this respect to the view of FIG. 4. The lowermost bracket for the stationary mast section has been identified by reference character 44' and it includes an overlapping joint 141. The portions of the bracket 44' that overlap can be joined together by bolts 142 so that an appropriate adjustment can be made in the spacing. A similar adjustment 144 is provided for the bracket 112' that corresponds to the previously described bracket 112 of the first embodiment. Another overlapping joint can be provided for the other cross brackets.

In addition to the adjustment provided for the side rails, the rollers 68' and 70' also can be adjusted. This is accomplished by providing shims 146 at the innermost side of the rollers. The supporting bracket 66 accommodates a collar 148 that receives a bolt 150. This threadably retains a bushing 152 for the roller 70' to increase the spacing of the roller 70' with respect to its mounting bracket 66. The thickness of the shim 146 can be chosen appropriately.

Figure 10:
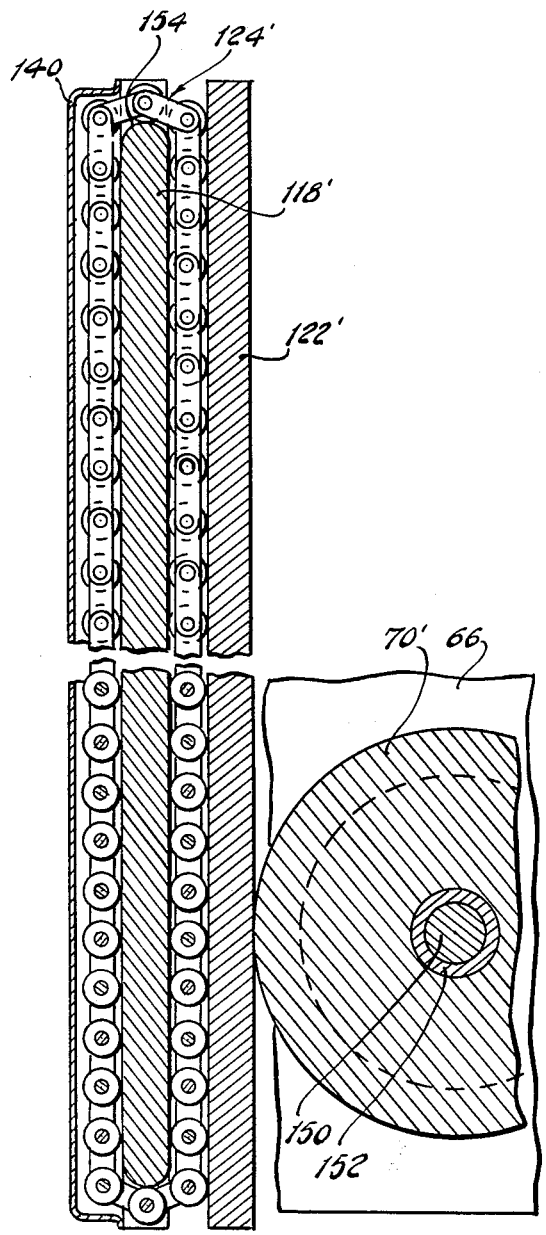
FIG. 10 is a cross sectional view showing details of the structure of FIG. 9 and is taken along section line 10—10 of FIG. 9. The structure of FIG. 10 is similar to corresponding structure in the embodiment of FIGS. 1 through 8.

In FIG. 10 I have illustrated in detail the mode of cooperation of the roller chain 124'. It will be observed that the side 118' is formed with a recess at its uppermost end and its lowermost end, each recess being rounded as indicated at 154. The cover 140 extends throughout the entire longitudinal extent of the side 118'. The outermost surface of the side 122' for the rail 146 engages one side of the rollers for the roller chain 124' and is guided as it is moved vertically by the aforementioned ram and pulley arrangement.

The structure shown in the cross sectional view of FIG. 10 corresponds to the roller chain and rail arrangement for the embodiment of FIGS. 1 through 8.

In FIGS. 12 through 16 I have illustrated a three stage mast construction employing the principles of my invention. It includes a base mast section 156, an intermediate mast section 158 and an uppermost mast section 160. Mast section 156 comprises parallel channels 162 and 166. They are held together at the uppermost end by bracket 168. Another bracket 170 is provided to hold the lower portion of the channels 162 and 166 together. Received within the channels or side rails for the mast section 156 are side rails 172 and 174 for the mast section 158. These are formed with a shape that is similar to the shape of the channels 162 and 166. They are held together at the uppermost end by bracket 176. At a lower portion of the mast section 158 a bracket 178 is provided for supporting the channels 172 and 174.

Mast section 160 includes side rails or channels 180 and 182. These are situated in telescopic relationship with respect to the rails of mast section 158, the latter in turn being related telescopically with respect to the rails of mast section 156. A cross bracket 183 is provided for joining together the upper portion of the rails 180 and 182. The lowermost portion of the rails 180 and 182 are joined together by bracket 184. The uppermost bracket 183 supports thereon a pair of pulleys 186 and 188 and the bracket 176 supports in a similar fashion a pair of pulleys 190 and 192. A hydraulic ram 194 is secured to bracket 176 and is received within the cylinder 196, the latter in turn being supported by the aforementioned 170 at the base of the mast sections.

A chain or cable 198 can be trained over pulley 186 and the one end thereof can be connected as shown at 200 to the bracket 176. The other end of the cable 198 is connected as shown at 202 to the carriage.

A similar cable 204 can be trained over pulley 188 and one end thereof can be connected to the bracket 176 and the other end thereof similarly can be connected to the carriage, this connection being shown at 206.

Figure 14:
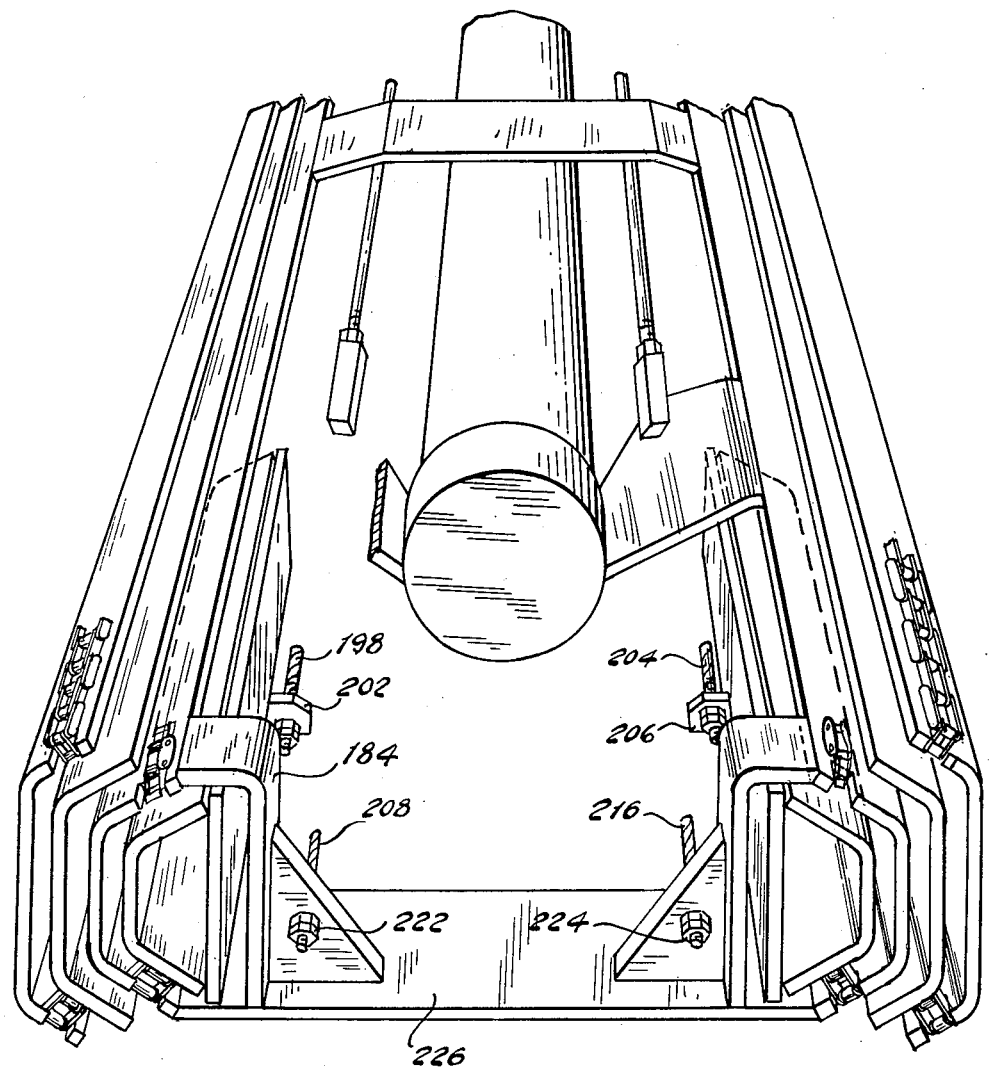
FIG. 14 is an enlarged isometric view of the lower portion of the structure of FIG. 12.

In a similar fashion a cable 208 can be trained over pulley 190 and one end thereof can be anchored as shown at 210 to an anchor rod 212, the latter in turn being connected at 214 to the bracket 170. Similarly, a cable 216 can be trained over the pulley 192 and one end thereof can be anchored at 218 to an anchor rod 220 connected to the bracket 170. The other ends of the cables 208 and 216 can be connected as shown in FIG. 14 to the lower portion of the uppermost mast section. The respective connections are illustrated at 222 and 224. For convenience, these connections are made with a cross bracket 226 that forms a part of the previously described bracket 184.

In FIG. 17 I have illustrated in detail the construction of the carriage that may be used with the mast construction of FIGS. 12 through 16. It includes forks 228 extending in a forward direction from a base plate structure generally identified by reference character 230. The carriage itself is identified generally by reference character 232. Mounting brackets 234 and 236 are provided for supporting guides 238 and 240, respectively. These guides have a cross sectional shape that is similar to the cross sectional shape of the channels 160 and 182 of the uppermost mast section.

As best observed in FIG. 15, the mast section 162 has two diverging sides 242 and 244. A roller chain 246 encircles the side 242 and a corresponding roller chain 248 encircles the side 244. These chains extend throughout the entire longitudinal extent of the mast section 156.

It will be apparent from FIG. 15 that the rails 172 and 180 are formed with a cross sectional shape that is similar to the cross sectional shape of rail 162. Rail 180 is formed with sides 250 and 252, and a roller chain 254 is trained over side 250 and extends in a longitudinal direction relative to the axis of the rail. In a similar fashion, a roller chain 256 is trained over side 252. These chains 254 and 256 extend throughout the entire longitudinal extent of the rails 180. The sides of the rail 172 engage the roller chains 246 and 254 as well as the roller chains 248 and 256.

The guide 238 for the carriage 232 is formed with a cross sectional shape similar in form to the cross sectional shape of rail 180 and its sides 258 and 260 engage the roller chains 254 and 256.

The relationship of the roller chains with respect to the rails 162, 172 and 180 can be best observed by referring to FIG. 16. The sides of the rail 162 are recessed at the uppermost portion and the lowermost portion as shown at 262 and 264, the base of the recess being rounded as indicated to facilitate transfer of the rollers from one side of the rail 162 to the other. It is thus seen that the roller chain 246 forms a continuous circuit about the rail 162, and more particularly the side 242. The roller chain 254 is received within recesses 266 and 268 and the lowermost end of the rail 180 thereby facilitating transfer of the rollers of the chain 254 from one side of the rail 180 to the other.

The roller chain used in the embodiment of FIGS. 12 through 16 can be similar in construction to the roller chain of FIG. 8.

The relationship between the roller chains 256 and 248 with respect to rail sides 252 and 244 is similar to that described in the foregoing paragraphs. Each chain forms a continuous recirculating circuit about its respective rail side.

When the ram or piston rod 194 is extended, the mast section 158 is moved vertically with respect to the stationary mast section 156. The roller chains associated with the rails of the mast section 158 are guided by roller chains trained over the sides of the rails for the mast section 156. Since the cables 208 and 216 are anchored, and since the free ends of these cables are connected to the lower portion of the mast section 160 this mast section will be raised with a speed that is twice the rate of movement of the ram. The cables 198 and 204 are anchored to the uppermost portion of the mast section 158 as previously described and the other ends of these cables are connected to the carriage. Thus the carriage will be moved upon movement of the ram at a speed that is equal to three times the rate of movement of the ram. The bearing action provided by the roller chains will permit a relatively friction-free motion of the carriage as well as the movable mast section during such a hoisting operation.

The rails 166, 174 and 182 cooperate with roller chains in the same fashion as the rails 162, 172 and 180. During such hoisting operations the rate of circulation of the chain will be sufficient to provide a complete rolling action between the sides of the rails. When the rails are moved at the relative speed ratios indicated in the foregoing paragraphs, there will be no scuffing action involved.

The cross sectional view of FIG. 18 is similar in form to the cross sectional view of FIG. 15 and shows the mode of cooperation of the rails for one side of the four stage mast construction. Numeral 270 designates a rail for a relatively stationary outer mast section, numeral 272 designates the next innermost movable mast section rail, numeral 274 indicates a second relatively movable mast section rail and numeral 276 indicates a rail for the uppermost mast section. These rails are formed with similar cross sectional shapes and with sides that form an angle with respect to the bases that are equal to each other. Such a four stage mast construction can accommodate a carriage of the type shown in FIG. 11, and the guide rollers 278 would correspond to the guide rollers 70 in the carriage of FIG. 11.

Roller chains 280 and 282 are trained over the sides for the rail 270 and roller chains 284 and 286 are trained over the sides for the rail 274. These chains extend longitudinally in a manner similar to the chains illustrated in FIG. 16 and they form a continuous circuit about their respective rails. They provide bearing action between the rails for each of the four mast sections during relative motion of these mast sections. This relative motion can be established by a chain and pulley or cable and pulley arrangement acting in cooperation with a hydraulic ram in a manner similar to that disclosed in my Patent No. 2,877,868. If the speed of movement of the rail 276 is three times the rate of movement of the rail 272 and the rate of movement of the rail 274 is twice the rate of movement of the rail 272, friction-free guidance of the mast sections during hoisting operations will be accomplished. The roller chains will circulate about their respective rails during such hoisting operations by reason of the rolling action of the roller chain rollers. The rate of movement of the carriage, of course, will be four times the rate of movement of the rail 272, the rollers 278 providing the proper guidance. These rollers can be tapered as indicated so that they conform in shape to the cross sectional shape of the rails of the uppermost mast section.

The four stage mast construction would include also another set of rails on the opposite side of the mast that are similar in form to the rails shown in FIG. 18. These rails would be connected to the rail shown in FIG. 18 by appropriate bracket structure to provide telescopically related mast sections, just as the rails of the mast construction of FIG. 12 are joined together. These other rails, of course, would be provided also with roller chains in a fashion similar to the rails of FIG. 18.

In FIG. 21 I have shown another carriage construction. It includes load lifting forks 288 and a face plate structure 290. The carriage itself is identified generally by reference character 292.

Supporting brackets 294 and 296 are connected to the base plate structure 292 and extend generally perpendicular to it. Secured to supporting brackets 294 and 296 are guide members or channels 298 and 300. Disposed about the sides of each channel 298 and 300 is a pair of roller chains. The roller chains associated with channel 300 can be seen best in FIG. 19. They are identified by reference characters 302 and 304. They may be similar in construction to the roller chain of FIG. 8. Channel 298 similarly is provided with roller chains although for simplicity only the roller chains for channel 300 will be described.

The guide 300 can be formed with a channel like cross section, and the open side of the channel 300 can be welded or otherwise secured to guide member 296. The guide members for the carriage of FIG. 17 may be secured by welding also to their respective guide brackets or members. Roller chain 302 is trained over one side 306 of the channel 300 and the uppermost portion and lowermost portion thereof can be recessed to accommodate the transfer of the rollers from one side of the channel to the other. The recess for the uppermost portion is indicated in FIG. 19 by reference numeral 308. In a similar fashion, roller chain 304 circulates about channel side 310 and it similarly is trained through recesses at the uppermost portion and lowermost portion of the side 310. The rollers of the chains 302 and 304 engage the outer bearing surfaces of the sides 306 and 310 as well as the inner bearing surfaces of the sides for an adjacent rail 46'.

The construction of FIG. 19 shows a portion of a two stage mast that would correspond to the embodiment of FIGS. 1 through 7. Reference may be made to FIG. 5 for purposes of comparison. Structure in FIG. 5 that has a counterpart in FIG. 19 is designated in FIG. 19 by the same reference character as that used in FIG. 5 although a primed notation has been applied in order to distinguish it.

The guide channels 300 and 298 shown in FIG. 21 have been elongated in order to provide a greater bearing surface.

As indicated in FIG. 20, the roller chain 302 circulates about the side 306 in a continuous fashion and the rollers are transferred from one side of the channel to the other during hoisting operations. The rate of circulation of the chain 302 is equal to one-half the rate of relative motion of the carriage with respect to the rails 46'.

In FIG. 22 I have illustrated still another modification. This is similar in form to the construction of FIG. 18 although it has been adapted to accommodate the carriage of FIG. 21. This view shows a cross section of a portion of a four stage mast. This portion of the construction corresponds to the portion of the mast constructions illustrated in FIGS. 5, 15 and 18. For convenience, the same reference characters in FIG. 18 and in FIG. 21 previously described have been used in FIG. 22 although primed notations have been added to avoid duplication. The rails of the mast construction of FIG. 22 function in the same fashion as the rails of FIG. 18. In lieu of the carriage and the rollers 278, however, I have provided a carriage that employs a roller chain and guide channel arrangement illustrated particularly in FIGS. 19, 20 and 21. The roller chains for the carrier guide channel engage the inner surfaces of the sides for the uppermost rail 276' thereby providing guidance for the carriage during hoisting operations.

In each of the embodiments that I have described the rails of the mast sections have sides that diverge relative to each other. By preference, the angle formed by the base of the channels and the associated sides is 105° although this can be varied if design considerations justify it. When the carriage is loaded, the reaction forces acting on the roller chains will be transmitted from one section to the other. The principal component of the torque that is produced by loading of the forks will be in a fore and aft direction and the angles of divergence on the rail sides is of sufficient degree to accommodate this principal component. Of course, if the forks are loaded eccentrically, a torque reaction in a transverse direction will be established. The rails can accommodate eccentric loading readily because of the divergence. If the angle of divergence were 135° rather than 105°, then obviously the ability of the mast to accommodate eccentric loadings would be substantially the same as the capacity to accommodate torque reaction in a fore and aft direction. For most purposes however, I find that the angle of 105° is sufficient to accommodate any transverse torques due to eccentric or side loading that may be experienced in actual materials handling operations.

In FIG. 23, I have illustrated a means for adjustably positioning a carrier guide on a carriage of the type illustrated in FIGS. 19, 20 and 21. The elements in FIG. 23 that are common to the structure of FIGS. 19, 20 and 21 have been designated by common reference characters although double prime notations have been added.

The guide 300" is welded to a plate 320 that can be bolted or otherwise secured to supporting bracket member 296". A similar plate can be provided for the other guide supporting member for the carriage. A shim 322 is situated between member 296 and the plate 320 so that the guide 300" can be adjustably positioned with respect to the guide member 296". Manufacturing tolerances can be accommodated by suitably choosing a shim of desired thickness.

Having thus described preferred embodiments of my invention, what I claim and desire to secure by United States Letters Patent is:

1. In a structural assembly, a plurality of adjacent structural members situated in nested telescopic relationship; each structural member having relatively diverging sides; means for moving said structural members relative to each other at predetermined speed ratios; and, movable anti-friction structure comprising bearing elements joined together in a continuous endless circuit encircling each diverging side of the odd numbered structural members of said plurality of structural members when counting inwardly from the outside one of said telescopically nested structural members whereby said structural members are guided during relative motion thereof in a common direction at their respective speeds.

2. The structure as defined in claim 1, wherein: said structural members are formed as channel members having diverging sides.

3. The structure as defined in claim 1, wherein: each of the movable anti-friction structures comprises at least one continuous recirculating roller chain.

4. A load hoisting mast, comprising: a plurality of mast sections; each mast section including a pair of spaced parallel side members; means for moving said mast sections relative to each other at predetermined speed ratios; the corresponding side members on each side of said mast sections being grouped one within the other in nesting telescopic relationship; and, flexible continuous movable anti-friction structure encircling the odd numbered side members when counting inwardly from the outside one of each group of side members and extending in a direction parallel to the direction of relative movement between said side members.

5. The load hoisting mast as defined in claim 4, wherein: said side members are provided with diverging sides.

6. The load hoisting mast as defined in claim 4, wherein: said side members are formed as channel members having diverging sides.

7. The load hoisting mast as defined in claim 6, wherein: a separate one of said anti-friction structures encircles each of the diverging sides of the odd numbered channels members of each group of side members.

8. The load hoisting mast as defined in claim 7, wherein: each of the anti-friction structures encircling the diverging sides of the odd numbered channel members comprises a continuous recirculating roller chain.

9. The load hoisting mast as defined in claim 6, wherein: said mast includes a carriage and a guide on each side of said carriage; and, each of the carriage guides is mounted in the innermost one of the channel members of each group of side channel members.

10. The load hoisting mast as defined in claim 9, wherein: each group of side channel members includes an odd number of channel members.

11. The load hoisting mast as defined in claim 10, wherein: each of the carriage guides comprises a guide member carried on one side of the carriage and which is guided by the anti-friction structure encircling the innermost one of the channel members of its respective group of side channel members.

12. The load hoisting mast as defined in claim 9, wherein: each group of side channel members includes an even number of channel members.

13. The load hoisting mast as defined in claim 12, wherein: each of the carriage guides comprises vertically spaced rollers carried on each side of the carriage, the rollers for each side being mounted for rotation in a separate one of the innermost channel members of the groups of telescopically nested side channel members.

14. The load hoisting mast as defined in claim 12, wherein: each of the carriage guides comprises a longitudinally disposed member having diverging sides mounted in nested telescopic relationship in the innermost one of the channel members of its respective group of telescopically nested side channel members, and, a recirculating roller chain encircling said longitudinally disposed member.

15. The load hoisting mast as defined in claim 14, wherein: each of the longitudinally disposed members of the carriage guides comprises a channel member having diverging sides, and said recirculating roller chain encircles the diverging sides of the channel member.

References Cited in the file of this patent

UNITED STATES PATENTS

| 2,664,970 | Warshaw | Jan. 5, 1954 |
| 2,754,020 | Dunn et al. | July 10, 1956 |
| 2,877,868 | Gunning et al. | Mar. 17, 1959 |

FOREIGN PATENTS

| 556,309 | France | Apr. 11, 1923 |